United States Patent [19]

Jarmon et al.

[11] Patent Number: 4,808,076
[45] Date of Patent: Feb. 28, 1989

[54] ROTOR FOR A GAS TURBINE ENGINE

[75] Inventors: David C. Jarmon, Kensington; Karl M. Prewo, Vernon, both of Conn.

[73] Assignee: United Technologies Corporation, Hartford, Conn.

[21] Appl. No.: 133,093

[22] Filed: Dec. 15, 1987

[51] Int. Cl.⁴ .............................................. F01D 5/34
[52] U.S. Cl. .......................... 416/230 A; 416/241 A; 501/95
[58] Field of Search ........... 416/230 R, 230 A, 241 R, 416/241 A, 229, 241 B; 415/212 R; 501/32, 93, 94, 95; 428/367

[56] References Cited

U.S. PATENT DOCUMENTS

| | | | |
|---|---|---|---|
| 4,256,378 | 3/1981 | Prewo et al. | 350/310 |
| 4,320,160 | 3/1982 | Nishimura et al. | 428/367 X |
| 4,341,826 | 7/1982 | Prewo et al. | 428/35 |
| 4,354,804 | 10/1982 | Cruzen | 416/230 |
| 4,363,602 | 12/1982 | Martin | 416/230 |
| 4,412,854 | 11/1983 | Layden | 501/95 X |
| 4,464,192 | 8/1984 | Layden et al. | 510/95 X |
| 4,465,434 | 8/1984 | Rourk | 416/230 |
| 4,581,053 | 4/1986 | Prewo et al. | 501/32 X |
| 4,613,473 | 9/1986 | Layden et al. | 264/103 |
| 4,738,902 | 4/1988 | Prewo et al. | 428/367 X |
| 4,747,900 | 5/1988 | Angus | 416/241 A X |

*Primary Examiner*—Robert E. Garrett
*Assistant Examiner*—Joseph M. Pitko
*Attorney, Agent, or Firm*—Kevin E. McVeigh

[57] ABSTRACT

A rotor for a gas turbine engine is disclosed. The rotor comprises a glass or glass ceramic matrix reinforced with silicon carbide yarn fiber reinforcement and with silicon carbide yarn reinforcement. The local volume fraction of silicon carbide monofilament increases with increasing radial distance from the inner diameter of the rotor. The rotor exhibits high hoop strength, high oxidation resistance at elevated temperatures and nonuniform elastic modulus which increases with increasing radial distance from the inner diameter of the rotor.

3 Claims, 1 Drawing Sheet

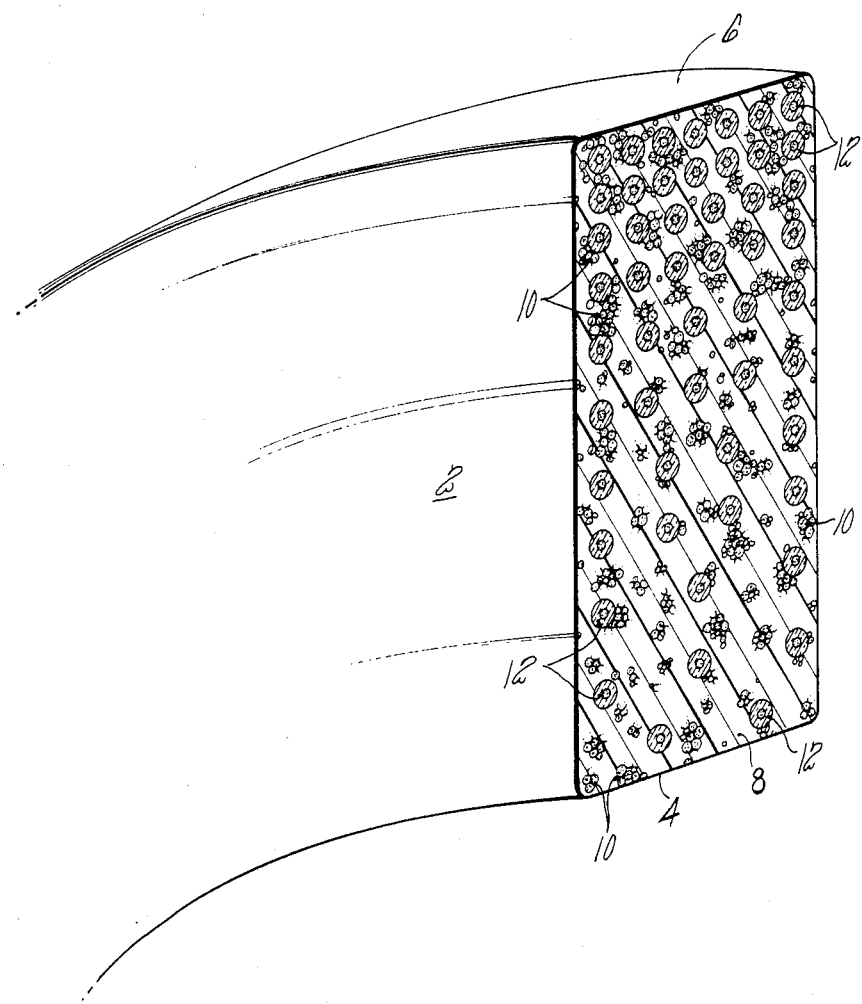

ROTOR FOR A GAS TURBINE ENGINE

CROSS REFERENCE TO RELATED APPLICATIONS

This invention is related to the invention disclosed in copending patent applications entitled "Process for Making a Fiber Reinforced Composite Article" Ser. No. 07/132,388, filed 12/15/87, and "Fiber Reinforced Composite Article" Ser. No. 07/132,389, filed 12/15/87, filed by David C. Jarmon; and David C. Jarmon and Karl M. Prewo, respectively on even date and assigned to the same assignee of this application.

TECHNICAL FIELD

This invention pertains to gas turbine engines, and more particularly to turbine rotors for gas turbine engines.

BACKGROUND ART

One of the primary goals in the development of advanced gas turbine engines is to maximize the ratio of thrust output to engine weight. Approaches for increasing the engine thrust-to-weight ratio include increasing the engine specific thrust (thrust/airflow) and reducing the engines specific weight (weight/airflow). An increase in specific thrust may be obtained by increasing the turbine rotor inlet temperature. A decrease in specific weight may be obtained by decreasing the density and/or the size of engine components. Neither approach is feasible with conventional materials.

There is an intensive effort to develop advanced materials and innovative configurations to provide lower density engine components which exhibit improved resistance to elevated temperature.

DISCLOSURE OF INVENTION

A turbine rotor is disclosed. The turbine rotor comprises a glass or glass-ceramic matrix, reinforced with both silicon carbide yarn fiber reinforcement and with silicon carbide monofilament fiber reinforcement. The volume percent of monofilament fiber reinforcement increases with increasing radial distance from the inner diameter of the turbine rotor. The turbine rotor of the present invention exhibits a nonuniform elastic modulus which increases with increasing radial distance from the inner diameter of the turbine rotor and provides high hoop strength and high oxidation resistance at elevated temperatures.

BRIEF DESCRIPTION OF DRAWINGS

The FIGURE shows a radial cross section of an exemplary turbine rotor of the present invention.

BEST MODE FOR CARRYING OUT THE INVENTION

The glass matrix material of the present invention is chosen on the basis of its temperature resistance and its chemical and thermal compatibility with the fiber reinforcement. Glasses which are chemically compatible with the fiber reinforcement do not react to substantially degrade the fiber reinforcement during processing. A glass matrix material is thermally compatible with the fiber reinforcement if the coefficient of thermal expansion of the glass and the fiber reinforcement are sufficiently similar that the composite article will not delaminate during thermal cycling due to excessive thermal stresses generated by differential thermal expansion of the glass matrix and the fibers. Borosilicate glass (e.g. Corning Glass Works (CGW) 7740), alumina silicate glass (e.g. 1723) and high silica glass (e.g. CGW 7930) as well as mixtures of glasses are suitable matrix materials. Glass-ceramic materials, such as lithium alumino silicate (LAS) magnesium alumino silicate (MAS), and calcium alumino silicate (CAS), which may be partially crystallized during processing as well as mixtures of glass ceramic materials and mixtures of glass materials and glass ceramic materials may also be used as the glass matrix material of the present invention. The choice of glass matrix material is dependent upon the particular demands of the intended application. For example borosilicate glass is the preferred glass matrix material for applications which require resistance to temperature of up to about 550° C., because while its temperature resistance is low in relation to the other glass materials, borosilicate glass is more easily processed than the other glass materials. For applications which require resistance to temperature of up to about 1200° C., glass ceramic materials, particularly LAS, are preferred matrix materials due to their superior temperature resistance.

The yarn fiber reinforcement of the present invention may comprise any organic yarn fiber that exhibits high tensile strength, high tensile modulus and oxidation resistance at elevated temperatures. Yarn fibers are typically small diameter fibers which are commercially available in multifilament (typically 500 or more filaments per tow) tows. Inorganic yarn fibers are typically produced by heating spun organic precursor fibers and are less than 30 microns in diameter. Suitable inorganic yarn fibers include silicon carbide fibers and refractory metal oxide fibers. Silicon carbide fibers are preferred. Nicalon ceramic grade fiber (Nippon Carbon Company) is a silicon carbide yarn that has been found to be particularly suitable for the practice of the present invention. The Nicalon yarn fiber is available in 500 filament tows with an average fiber diameter between 5-15 microns and has a tensile strength of about 2,070 megapascals (MPa) and an elastic modulus of about 176 gigapascals (GPa).

The monofilament fiber of the present invention may comprise any inorganic monofilament fiber that exhibits high tensile strength, high tensile modulus and oxidation resistance at elevated temperatures. Monofilament fibers are relatively large diameter fibers available as a single filament. Inorganic monofilament fibers are typically produced by the chemical vapor deposition of the fiber material onto a carbon or tungsten core, and are typically greater than about 100 microns in diameter. Silicon carbide monofilament fibers are preferred. SCS-6 silicon carbide monofilament fiber available from AVCO Specialty Materials Division is particularly preferred. SCS-6 fiber is nominally 144 microns in diameter and exhibits an ultimate tensile strength of about 3,450 MPA and an elastic modulus of about 413 GPA.

The composition of the turbine rotor varies with radial distance from the inner diameter of the rotor. The composition of the rotor is described herein in terms of local volume fractions, where a local volume fraction describes the relative composition of a local volume element. A local volume element is herein defined as a cylindrical shell having a width equal to the width of the rotor and having an inner radius of r, and an outer radius of $r + \Delta r$, wherein $\Delta r$ is equal to a factor of 4 times the fiber diameter of the monofilament fiber reinforcement. The local volume percent of monofilament fiber may be between 0 percent and about 50 percent. The local volume percent of yarn fiber reinforcement may be between about 15 percent and about 50 percent. The local volume percent of matrix material may vary between about 20 percent and about 50 percent. It will be appreciated that these values are necessarily approximate in applications having a composition which varies monotonically with radial distance from the inner diameter of the rotor.

The physical properties of the rotor are also location specific and may be described in terms of local physical properties, specific to a particular local volume element. The local composition is chosen to provide selected values for the local tensile strength and local elastic modulus.

The particular composition required to provide a particular local physical property having a value within a selected range may be calculated using rule of mixture equations modified to reflect the presence of two types of reinforcing fibers. For example, the longitudinal and transverse moduli for a unidirectionally oriented monofilament and yarn fiber reinforced article may be predicted by the following equations (adapted from equations developed by Halpin & Tsai, J. C. Halpin, Primer on Composite Materials: Analysis, Technomic Pub. Co. Lancaster, Pa., 1984).

$$E_{11} = V_{f1}E_{11f1} + V_{f2}E_{11f2} + V_m E_m \quad \text{(Equation 1)}$$

and $$E_{22} = E_m \left[ \frac{(1 + \xi \eta_2 V^*_{f2})}{(1 - \eta_2 V^*_{f2})} \right] \left[ \frac{(1 + \xi \eta_1 V_{f1})}{(1 - \eta_1 V_{f1})} \right] \quad \text{(Equation 2)}$$

where
- $E_{11}$ = longitudinal composite modulus
- $E_{11f1}$ = fiber 1 longitudinal modulus
- $E_{11f2}$ = fiber 2 longitudinal modulus
- $E_{22}$ = transverse composite modulus
- $E_{22f1}$ = fiber 1 transverse modulus
- $E_{22f2}$ = fiber 2 transverse modulus
- $E_m$ = matrix modulus
- $V_{f1}$ = volume percent fiber 1
- $V_{f2}$ = volume percent fiber 2
- $V^*_{f2}$ = volume percent fiber 2 in glass only
- $V_m$ = volume percent matrix
- $\eta_1 = [(E_{f1}/E_m) - 1]/[(E_{f1}/E_m) + 2]$
- $\eta_2 = [(E_{f2}/E_m) - 1]/[(E_{f2}/E_m) + 2]$
- $\xi = 2$ = constant The turbine rotor of the present invention may be made by a hot pressing process such as that disclosed in copending application entitled "Process for Making a Fiber Reinforced Composite Article" or by a matrix injection process such as that disclosed in commonly assigned U.S. Pat. No. 4,428,763.

A radial cross section of a turbine rotor 2 of the present invention is shown in the FIGURE. The turbine rotor 2 extends radially from an inner diameter 4 to an outer diameter 6. The turbine rotor 2 comprises a glass or glass ceramic matrix 8 reinforced with circumferentially-oriented silicon carbide yarn fibers 10 and with circumferentially-oriented silicon carbide monofilament fibers 12. The SiC yarn fibers 10 are uniformly distributed throughout the matrix 8 and the volume fraction of SiC monofilament fibers 12 relative to the overall volume of the turbine rotor 2 increases with increasing radial distance from the inner diameter 4 of the turbine rotor 2.

EXAMPLE

A preferred hot press method for making the turbine rotor of the present invention includes steps of preparing a plurality of monofilament fiber tapes, preparing a plurality of yarn fiber tapes, sandwiching each monofilament tape between two yarn tapes to form a plurality of composite plies, laying up a plurality of composite plies to form a composite rotor preform and consolidating the composite rotor preform to form the composite turbine rotor.

Table I outlines the composition of each of a series of 25 composite plies, gives the elastic modulus calculated using Equation 1 above for each ply composition, and gives the composition of the monofilament fiber tape and of the yarn fiber tape from which each of the 25 composite plies is fabricated.

TABLE I

| Ply No. | Elastic Modulus (GPa) | TPIMF | VFMF | TPIYF | VFYF | GSCM (× 10³) | VFM |
|---|---|---|---|---|---|---|---|
| 1 | 165 | 35.7 | 15 | 6.85 | 34 | 8.75 | 51 |
| 2 | 168 | 36.9 | 16 | 6.60 | 33.6 | 8.40 | 50.4 |
| 3 | 170 | 38.0 | 17 | 6.30 | 33.2 | 8.05 | 49.8 |
| 4 | 173 | 39.1 | 18 | 6.05 | 32.8 | 7.70 | 49.2 |
| 5 | 176 | 40.2 | 19 | 5.80 | 32.4 | 7.40 | 48.6 |
| 6 | 179 | 41.2 | 20 | 5.60 | 32.0 | 7.15 | 48.0 |
| 7 | 182 | 42.3 | 21 | 5.40 | 31.6 | 6.90 | 47.4 |
| 8 | 185 | 43.3 | 22 | 5.20 | 31.2 | 6.65 | 46.8 |
| 9 | 188 | 44.2 | 23 | 5.05 | 30.8 | 6.40 | 46.2 |
| 10 | 191 | 45.2 | 24 | 4.85 | 30.4 | 6.20 | 45.6 |
| 11 | 194 | 46.1 | 25 | 4.90 | 30.0 | 6.00 | 45.0 |
| 12 | 197 | 47.0 | 26 | 4.55 | 29.6 | 5.80 | 44.4 |
| 13 | 200 | 47.9 | 27 | 4.40 | 29.2 | 5.60 | 43.8 |
| 14 | 203 | 48.8 | 28 | 4.25 | 28.8 | 5.45 | 43.2 |
| 15 | 206 | 49.7 | 29 | 4.15 | 28.4 | 5.25 | 42.6 |
| 16 | 209 | 50.5 | 30 | 4.10 | 28.0 | 5.10 | 12.0 |
| 17 | 212 | 51.3 | 31 | 3.90 | 27.6 | 4.95 | 41.4 |
| 18 | 214 | 52.2 | 32 | 3.75 | 27.2 | 4.80 | 40.8 |
| 19 | 217 | 53.0 | 33 | 3.65 | 26.8 | 4.65 | 40.2 |
| 20 | 220 | 53.8 | 34 | 3.55 | 26.4 | 4.50 | 39.6 |
| 21 | 223 | 54.5 | 35 | 3.45 | 26.0 | 4.40 | 39.0 |
| 22 | 226 | 55.3 | 36 | 3.35 | 25.6 | 4.25 | 38.4 |
| 23 | 229 | 56.1 | 37 | 3.25 | 25.2 | 4.15 | 37.8 |
| 24 | 232 | 56.8 | 38 | 3.15 | 24.8 | 4.00 | 37.2 |

TABLE I-continued

| Ply No. | Elastic Modulus (GPa) | TPIMF | VFMF | TPIYF | VFYF | GSCM (× 10³) | VFM |
|---|---|---|---|---|---|---|---|
| 25 | 235 | 57.6 | 39 | 3.05 | 24.4 | 3.90 | 36.6 |

Where
TPIMF = turns monofilament fiber/inch width monofilament tape
VFMF = volume fraction monofilament fiber in composite ply
TPIYF = turns yarn fiber/inch width yarn tape
VFYF = volume fraction yarn fiber in composite ply
GSCM = grams glass powder/cm² yarn tape
VFM = volume fraction glass powder in composite ply A series of 25 monofilament tapes is fabricated. Silicon carbide monofilament fiber (SCS-6) is wound on a 28 inch diameter round mandrel. The mandrel is covered with a 0.001 inch thick layer of inert film (Mylar). A monofilament fiber is wound at 35.7 turns of fiber per inch for a width of 2 inches to form a monofilament fiber layer. The monofilament layer is coated with a layer of organic binder (Rhoplex AC-33 available from Rhom and Haas). Sufficient binder is applied to result in a fiber tape which may be readily handled. The quantity of binder is not critical. The coated monofilament layer is dried on the mandrel with a heat lamp for 30 minutes to form a monofilament fiber tape. Once dried, the tape is cut at one location and removed from the mandrel. The remaining 24 tapes in the series are each made according to a similar procedure, differing only in the number of turns of monofilament fiber per inch of width of monofilament fiber taper. The number of turns of monofilament fiber per inch of width of monofilament tape (TPIMF) for each of the 25 monofilament tapes is given in Table I.

A series of 25 pairs of yarn fiber tapes are made. A 28 inch diameter round mandrel is wrapped with a 0.001 inch thick layer of inert film. The ⅛ inch diameter tensioning rod is inserted under the film parallel to the longitudinal axis of the mandrel. A tow of yarn fiber is drawn off a spool with no applied back tension, is passed through a flame to thermally decompose the yarn sizing, and is wound on the mandrel at 6.85 turns per inch for a width of 2 inches to form a yarn fiber layer. After winding the tensioning rod is removed to loosen the yarn turns. A slurry comprising 1 part by weight borosilicate glass powder and 2 parts by weight Rhoplex AC-33 acrylic binder is mixed. Pools of the slurry sufficient to provide $8.75 \times 10^{-3}$ grams glass/cm² yarn fiber layer are applied to the fibers with a spoon at relatively uniform spacing. A layer of 0.001 inch thick inert film (Mylar) is wrapped around the fiber/slurry layer on the mandrel. The slurry is evenly applied to the fibers and the fibers are spread across the surface of the mandrel by the application of light pressure to the tape in the direction of the fibers with a hand held rubber roller. The film is removed and the tape is dried with a heat lamp for 30 minutes. The tape is cut in one location and removed from the mandrel. The remaining 24 pairs of yarn fiber tapes are prepared by a similar process but with a different number of turns of yarn fiber per inch of width of yarn fiber layer and a different quantity of glass per area of yarn fiber layer. The number of turns of yarn fiber per inch width of yarn tape (TPIYF) for each of the 25 pairs of yarn tape is given in Table I. The quantity of glass matrix powder/yarn fiber tape area in grams glass/cm² yarn tape (GSCM) applied to each of the tapes is also given in Table I.

A series of 25 composite plies are made. Each composite ply is made by sandwiching a monofilament tape between the corresponding pair of yarn tapes. Each of the composite plies is warm molded at 150° C. and 100 psi for 10 minutes to partially debulk the ply.

The debulked composite plies are laid up to form a composite rotor preform. Each ply is wrapped around the circumference of the rotor two times and cut to an appropriate length to provide a layer which is two plies thick wherein the fiber reinforcement in each ply is oriented parallel to the circumference of the rotor (i.e. a "0°" layup). If desired, layers of glass impregnated SiC scrim may be selectively included between composite plies to provide axial reinforcement. The innermost ply contains 15 volume percent monofilament and the remaining 24 plies are laid up in sequence of increasing volume percent of monofilament fiber. The composite rotor preform is heated in air at 500° C. for 2 hours to decompose the organic binder. The volume fraction of monofilament fiber (VFMF), the volume fraction of yarn fiber (VFYF) and the volume fraction of glass matrix (VFM) for each of the 25 composite plies are given in Table I. The volume fractions listed assume full consolidation of the composite plies (i.e. no voids).

The composite preform is hot pressed at 1250° C. for 30 minutes at 1000 psi under argon gas to consolidate the composite rotor. The consolidation pressure is applied axially.

The rotor has an inner diameter of about 12 inches, an outer diameter of about 14 inches and a width of about 1 inch. The physical properties of the rotor at a given radial distance from the inner diameter of the rotor are local physical properties which correspond to the local composition. For example, based on the values given in Table I, the modulus of the rotor may be expected to increase in stepwise fashion from about 165 GPA at the inner radius to about 235 GPA at the outer radius.

The turbine rotor of the present invention exhibits a nonuniform elastic modulus which increases with increasing radial distance from the inner diameter of the turbine rotor and provides high hoop strength and high oxidation resistance at elevated temperatures.

The nonuniform modulus of the turbine rotor of the present invention allows the ring to carry higher loads. When a thick walled ring is subjected to uniform internal radial pressure, the tensile stress on the ring is the highest at the inner radius of the ring. By allowing the local elastic modulus of the rotor to increase with increasing radius, the stress concentration at the inner diameter may be reduced and the rotor may carry a higher load. The nonuniform modulus approach to increasing the load carrying ability of the rotor might be pursued using graphite fibers. Since graphite fibers are available in a range of different elastic moduli, a glass matrix composite rotor having a nonuniform modulus may be fabricated by conventional means using graphite fibers of different moduli. There are, however, two areas of concern with regard to the use of graphite reinforcement in a turbine rotor. The oxidation resistance of graphite fiber is poor and graphite reinforced glass matrix turbine rotor having a nonuniform modulus would exhibit marginally adequate hoop strength.

SiC fibers exhibit higher oxidation resistance than graphite fibers and SiC monofilament fibers typically exhibit a much higher tensile strength than graphite fibers and allow the fabrication of a turbine rotor which exhibits a nonuniform elastic modulus, provides high loop strength and high resistance to oxidation at elevated temperatures.

Although this invention has been shown and described with reference to detailed embodiments thereof, it will be understood by those skilled in the art that various changes in form and detail thereof may be made without departing from the spirit and scope of the claimed invention.

What is claimed:

1. A turbine rotor comprising a glass or glass ceramic matrix reinforced with silicon carbide yarn fiber reinforcement and with silicon carbide monofilament fiber reinforcement, wherein the local volume fraction of the silicon carbide monofilament fiber reinforcement increases with increasing radial distance from the inner diameter of the turbine rotor so that the turbine rotor exhibits high hoop strength, oxidation resistance at elevated temperature and a nonuniform elastic modulus which increases with increasing radial distance from the inner diameter of the turbine rotor.

2. The turbine rotor of claim 1, wherein the glass matrix comprises borosilicate glass.

3. The turbine rotor of claim 1, wherein the glass ceramic matrix comprises lithium alumino silicate glass ceramic.

* * * * *